United States Patent
Rademacher et al.

(10) Patent No.: US 9,145,041 B2
(45) Date of Patent: Sep. 29, 2015

(54) AIR MIXING APPARATUS FOR HVAC SYSTEM

(75) Inventors: Greg Rademacher, Ortonville, MI (US); Thomas Adler, Royal Oak, MI (US); Yang Chen, Windsor (CA)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 1511 days.

(21) Appl. No.: 12/182,707

(22) Filed: Jul. 30, 2008

(65) Prior Publication Data

US 2009/0036048 A1 Feb. 5, 2009

Related U.S. Application Data

(60) Provisional application No. 60/935,207, filed on Jul. 31, 2007.

(51) Int. Cl.
*B60H 1/00* (2006.01)

(52) U.S. Cl.
CPC .. *B60H 1/00678* (2013.01); *B60H 2001/00092* (2013.01); *B60H 2001/00721* (2013.01)

(58) Field of Classification Search
CPC .................................................. B60H 1/00678
USPC .............. 454/156, 139, 141, 143, 159; 62/42
See application file for complete search history.

(56) References Cited

U.S. PATENT DOCUMENTS

| | | | |
|---|---|---|---|
| 4,452,301 A * | 6/1984 | Last et al. ........................ 165/42 |
| 6,789,607 B1 * | 9/2004 | Jun et al. ........................... 165/43 |
| 6,789,617 B1 * | 9/2004 | Hashizume et al. ........... 165/202 |
| 6,796,368 B1 * | 9/2004 | Saida et al. ...................... 165/43 |
| 7,625,273 B2 * | 12/2009 | Komowski ..................... 454/121 |
| 2002/0108385 A1 * | 8/2002 | Rivalta et al. .................... 62/244 |
| 2005/0116054 A1 * | 6/2005 | Richter et al. ................ 236/49.1 |
| 2005/0269071 A1 * | 12/2005 | Simmet et al. ................. 165/202 |
| 2006/0070387 A1 * | 4/2006 | Yamaguchi et al. ............. 62/186 |
| 2007/0175623 A1 * | 8/2007 | Park et al. ..................... 165/202 |

* cited by examiner

*Primary Examiner* — Alissa Tompkins
*Assistant Examiner* — Brittany Towns
(74) *Attorney, Agent, or Firm* — Foley & Lardner LLP

(57) ABSTRACT

A vehicle HVAC system comprises an evaporator, a heater core, an air mixing door between the evaporator and the heater core, the air mixing door being configured to direct a portion of an airflow to either bypass or pass over the heater, and a baffle. The baffle is configured to gradually change the area available to a portion of the airflow as the air mixing door is moved.

13 Claims, 4 Drawing Sheets

AIR MIXING APPARATUS FOR HVAC SYSTEM

BACKGROUND

The present application relates to vehicle heating, ventilation and air conditioning (HVAC) systems. In particular, the present application relates to baffles and other structures used to influence air flow through vehicle HVAC systems.

Vehicle HVAC systems may include cabin controls that are used by a vehicle occupant to control the outlet temperature and airflow of the air being delivered into the vehicle cabin from the HVAC system. It may be desirable to configure an HVAC system to provide a linear relationship between the position of a temperature controller and the outlet temperature. For example, when the controller is in a position half way between the coldest and hottest settings, the outlet temperature may be about half way between the coldest and hottest outlet temperatures.

In particular, it may be advantageous to linearize the relationship between the Normalized Temperature ($T_N$) and the controller position. The normalized temperature is defined according to the following formula:

$$T_N = (T_{outlet} - T_{min})/(T_{max} - T_{min})$$

where $T_{outlet}$ is the average outlet temperature when the HVAC system is at a steady state for a given controller position, $T_{min}$ is the outlet temperature at steady state with the controller at the full cold position, and $T_{max}$ is the outlet temperature at steady state when the controller is in the full hot position.

One way of increasing the linearity of the relationship between controller position and outlet temperature is to position a baffle in the air flow to adjust the airflow characteristics of the system. In some systems that utilize a pivoting temperature door to direct a portion of the air flow over a heater core, a baffle may be positioned downstream from the evaporator.

It would be advantageous to provide an HVAC system having a more linear control relationship between the position of the temperature control and the normalized temperature.

SUMMARY

One embodiment of the invention relates to a vehicle HVAC system comprising: an evaporator, a heater core, an air mixing door between the evaporator and the heater core, the air mixing door being configured to direct a portion of an airflow to either bypass or pass over the heater, and a baffle. The baffle is configured to gradually change the area available to a portion of the airflow as the air mixing door is moved.

Another aspect of the invention relates to a method of regulating airflow through a vehicle HVAC system that includes an air mixing door and a baffle structure within an air flow region of the vehicle HVAC system. The method comprises passing air through the system and adjusting the position of the air mixing door relative to the baffle structure to determine a bypass air flow area, wherein the baffle structure is configured to gradually change the bypass flow area.

Yet another embodiment relates to a vehicle HVAC system comprising an evaporator, a heater core, an air mixing door, and a structure positioned downstream of the evaporator and upstream of the air mixing door. The structure is configured to gradually change an area available to a portion airflow as the air mixing door is moved, such that the relationship between a controller position and an output temperature of the HVAC system is generally linear.

DETAILED DESCRIPTION OF PREFERRED EMBODIMENTS

Figure 6:
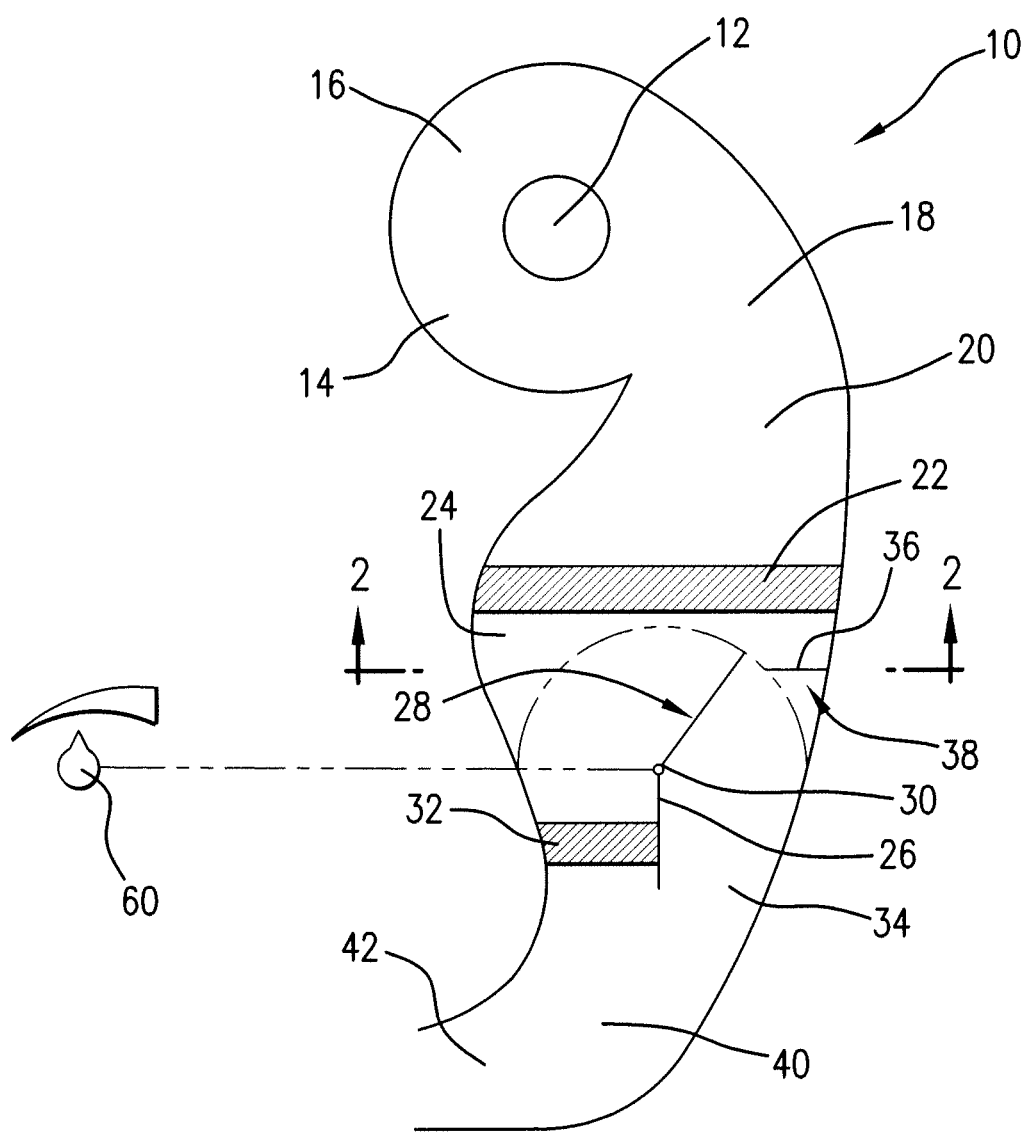
FIG. 6 is a schematic cross sectional view taken through a vehicle HVAC system of the general configuration shown in FIG. 1.

Referring to FIG. 6, a vehicle heating ventilation and air conditioning system (HVAC) 10 includes a blower motor 12, a housing 14 and a blower scroll 16. Blower motor 12 draws air into the system and pushes it through the HVAC system before it exits into a vehicle passenger compartment. Air exits blower scroll 16 through an outlet 18 and into a channel 20. The air then passes over evaporator 22 where it may be cooled when the HVAC system is operating in an air conditioning mode. In some embodiments, channel 20 may have an increasing cross sectional area as the air flow approaches evaporator 22. This allows for a slower linear velocity of the air as it passes over the evaporator thereby, increasing residence time through the evaporator and optimizing efficiencies. After exiting evaporator 22, the air flow enters passage 24. Passage 24 may be divided by a wall 26. Air flow is directed to either side of wall 26 by a variable airflow control device, e.g., shown as temperature door 28 which pivots about pivot point 30. On one side of wall 26 all or part of the air may pass over heater core 32 where the air is warmed prior to exiting the HVAC system. Another portion or all of the air may also be directed around to bypass heater core 32 through passage 34.

A user interface, such as a knob or dial 60, in the passenger compartment may be used to control the position of the temperature door 28, thereby effecting the portion of the air flow over heater core 32. In many vehicle applications, it is desirable to have a linear relation between the position of the knob or dial and the output airflow temperature. However, the geometries of the passageways, heater core temperature door, and other structures associated with HVAC system 10 may result in a non-linear relationship. The inclusion of baffle 36 at a point downstream of evaporator 22, and before the temperature door 28, can partially obstruct and direct the air flow, resulting in a more linear relationship between the knob or dial position and the output temperature.

Figure 1:
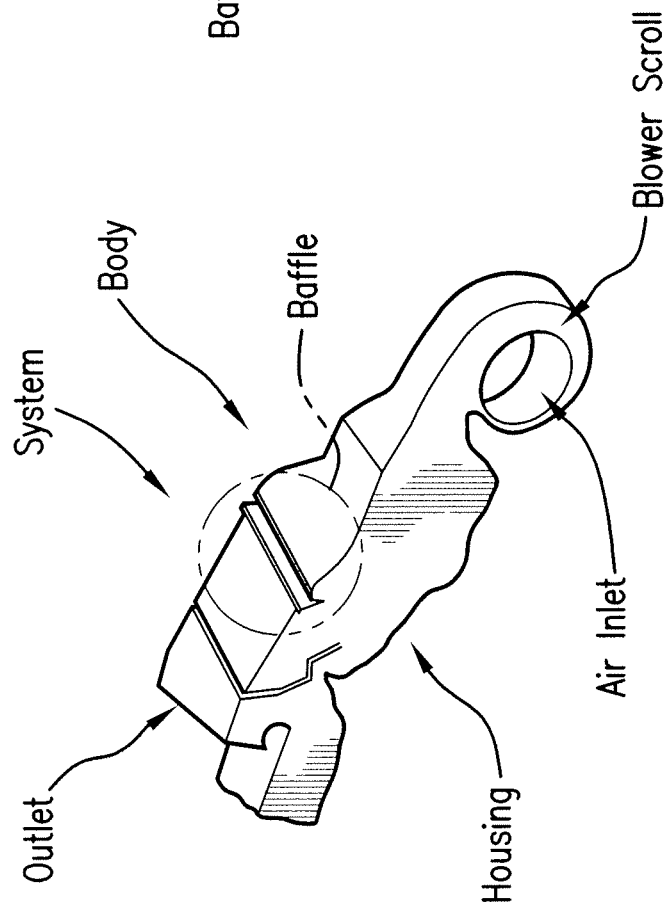
FIG. 1 is a perspective view of a vehicle HVAC system.

Referring to FIG. 1, illustrating the particular baffle design according to the present invention, an HVAC system includes a housing having a body portion. The air enters the housing through an air inlet where the air is drawn in by a blower motor (not shown in detail). The air is accelerated around a blower scroll and into the body portion of the housing. In the housing, portions of the air may be selectively separated and passed over an evaporator, a heater, or both. After the air has been heated and/or cooled the separated portions of air may be mixed, and then exit into the passenger compartment. A baffle may be positioned in the airflow path. The baffle may be formed as a molded feature of the housing which itself may be molded from plastic or other suitable materials. Alternatively, the baffle may be constructed separately and added to the housing. In these embodiments, the baffle may be coupled to the housing by adhesive, fasteners or other means including ultrasonic welding.

Figure 2:
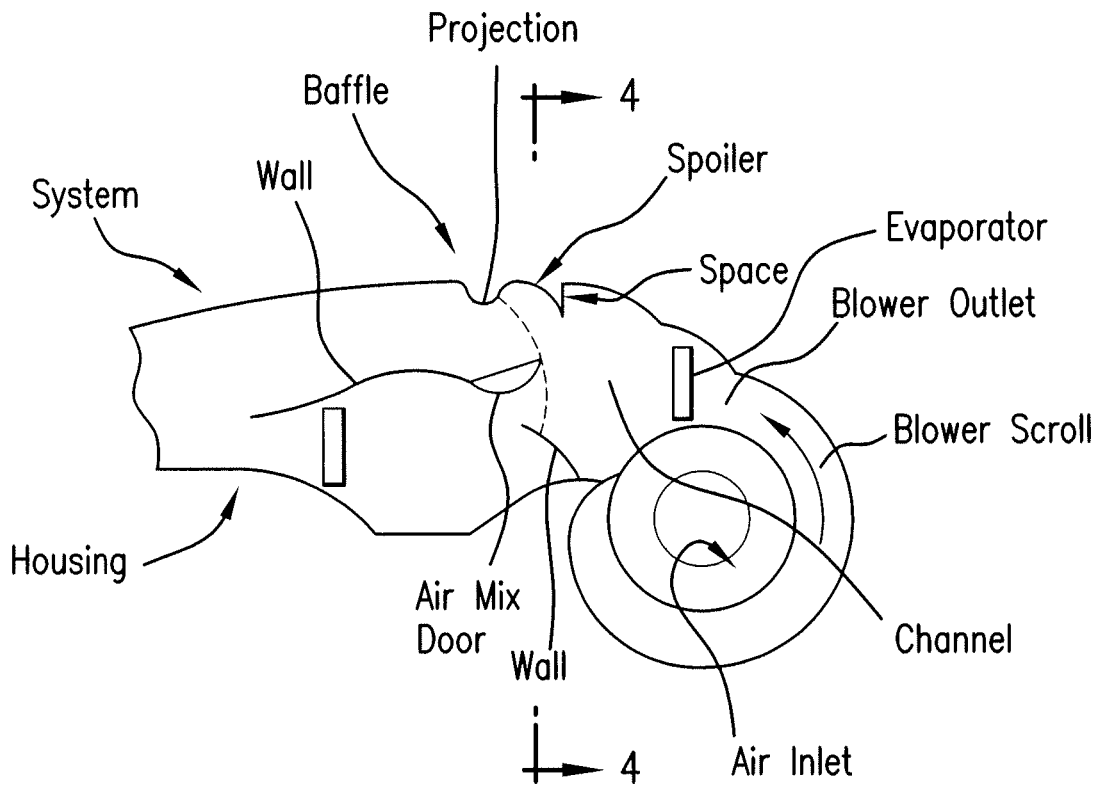
FIG. 2 is a cross sectional view of the system of FIG. 1.

Referring to FIG. 2, the HVAC system of FIG. 1, further comprises an evaporator, a channel, a baffle that may include an extension shown as a spoiler and a projection, an air mix door, interior walls for directing portions of the airflow, and a heater core. Air is drawn into the housing by a blower motor disposed in the blower scroll. The air then exits the blower scroll at the blower outlet. At least a portion of the air then passes over an evaporator.

When the HVAC system is operated in the air conditioning mode, condensed, pressurized refrigerant is fed to the evaporator where the refrigerant is flashed. The evaporating refrigerant absorbs heat from the air as the air flows over the evaporator. The cooled air then passes through a channel toward the air mix door. The air mix door cooperates with the interior walls of the housing to direct the airflow. The airflow may be partially or entirely directed to flow over the heater core, or the airflow may be directed to bypass the heater core. At a point downstream of the heater core, the portion (if any) of the airflow directed over the heater core, and the portion (if any) directed to bypass the heater core are mixed. Upstream of the mixing door, a baffle extends into the airflow. A projection extends into the airflow slightly downstream of the air mix door such that a downstream surface of the air mix door can cooperate with an upstream face of the projection, to direct substantially all of the airflow over the heater core when the controller is in the full heating position. While the system is shown with the baffle positioned in the portion of the airflow that bypasses the heater core, the baffle may be used elsewhere, such as in the portion of the airflow that passes over the heater core. Alternatively, baffles may be positioned on opposing walls of the housing.

Figure 3:
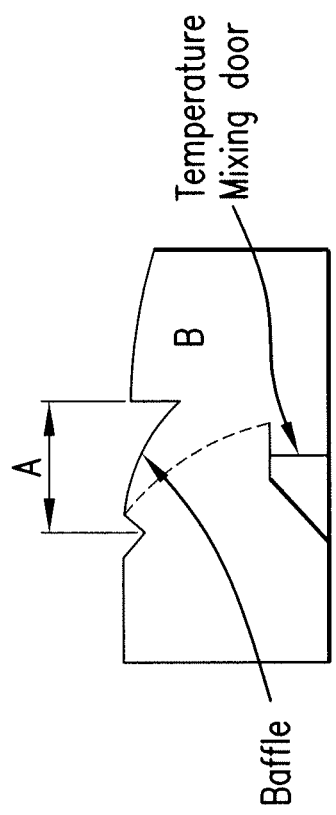
FIG. 3 is another cross sectional view of the system of FIG. 1.

Referring to FIG. 3, the spoiler of the baffle extends from a side wall of the housing into the airflow upstream of the temperature mixing door. The presence of the spoiler limits the amount of cross sectional area available for the portion of the airflow directed to bypass the heater core such that a larger displacement of the air mix door is required to provide the same cross sectional area for airflow in a similar housing without the spoiler.

The height of the air mix door is generally less than the height of the flow path. The baffle is preferably formed as a 3-dimensional right triangle with sides A and B and a convex curve on the hypotenuse. The cross-sectional shape (in the axial direction of the air flow channel) is approximately that of the lower half of a bow-tie. The curve of the hypotenuse has a radius that is preferably greater than the radius of the air mix door movement; however the focal point of the radius is preferably not the same as the temperature flap. The focal point is offset to allow both curves to meet at the point where the flap is closed. As the temperature flap is motivated, the variable pressure baffle will change the pressure upstream of the air mix door and thus cause a restriction of the airflow path. The radius of the hypotenuse can be selected to give the specified pressure needed to create a gradual reduction or increase in the upstream pressure on airflow path thus creating a smooth transition of temperature.

The spoiler and the extension may be spaced along the airflow path. The ratio of the distance (A) from the face of the spoiler to the center of the projection (i.e., the length of the spoiler), to the maximum height of the spoiler (B) may be from about 5:1 to 1:5. In preferred embodiments, the ratio of A:B may be from about 4:1 to 1:1. In yet other more preferred embodiments, the ratio of A:B may be from about 3:1 to 2:1, and in some especially preferred embodiments the ratio may be about 2.5:1. The desired ratio of A:B may be selected to give the specified pressure needed to create a gradual reduction or increase in the upstream pressure on airflow path thus creating a smooth transition of temperature.

Figure 4:
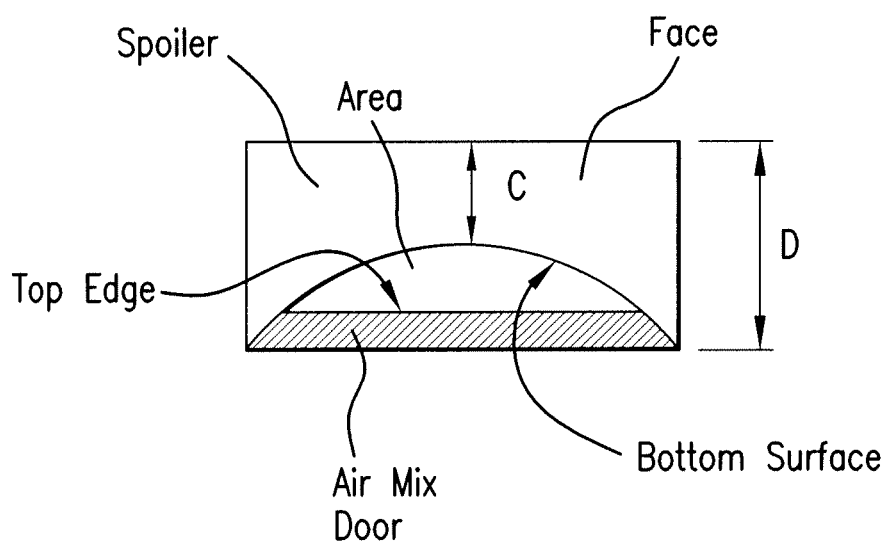
FIG. 4. is a cross sectional view of the system of FIG. 1, taken along line 4-4 shown in FIG. 2.

Referring to FIG. 4, the spoiler has a face that faces upstream, toward the evaporator. The face is bounded on three sides by the walls of the housing. The bottom surface is curved in a plane perpendicular to the airflow path. The curve of the spoiler is generally concave. The height of the spoiler at the middle is denoted as line C, and the height of the spoiler is denoted as line D. The ratio of the heights (C:D) may be about 1:1.1 to 1:5. More preferably, the ratio of the heights (C:D) may be about 2:3 to 3:5, and even more preferably, the ratio of the heights (C:D) may be about 3:4.

The concave configuration allows for a more gradual temperature transition and a more linear control relationship. As the air mix door moves upwardly (as shown in FIG. 4) the top edge of the air mix door will gradually decrease the area available to the airflow.

Figure 5:
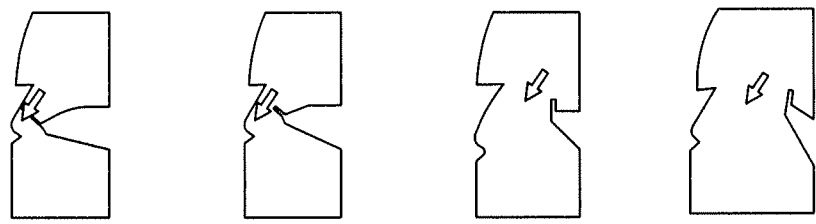
FIG. 5 is a chart showing the relationship between controller knob position and normalized temperature.
Figure 5:
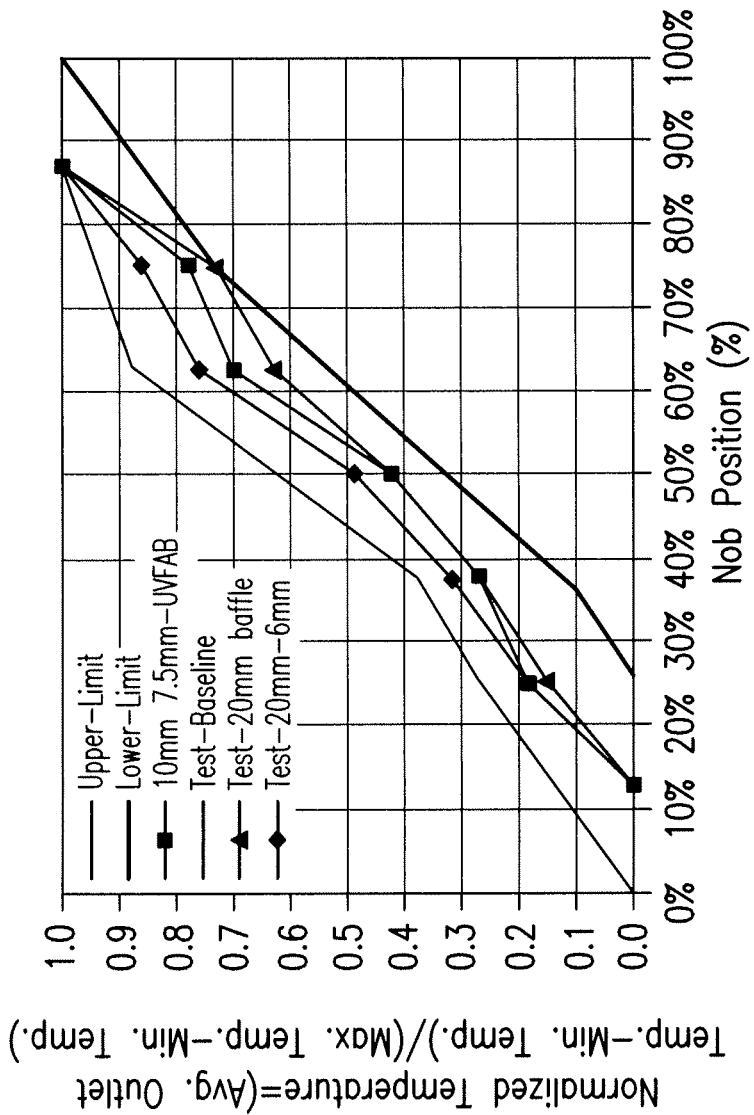

Referring to FIG. 5, a variety of baffle configurations were tested. A base line test was conducted without a spoiler in the airflow path. Three spoiler configurations were tested where one was a square baffle (i.e., a baffle where the height is constant across its length), and two spoilers with concave faces were used. The concave faced spoilers provided a more linear relationship between controller knob position and normalized temperature than either the design without a spoiler or the square baffle.

Although the foregoing has been described with reference to exemplary embodiments, workers skilled in the art will recognize that changes may be made in form and detail without departing from the spirit and scope thereof. For example, although different example embodiments may have been described as including one or more features providing one or more benefits, it is contemplated that the described features may be interchanged with one another or alternatively be combined with one another in the described example embodiments or in other alternative embodiments. The present subject matter described with reference to the example embodiments and set forth in the following claims is manifestly intended to be as broad as possible. For example, unless specifically otherwise noted, the claims reciting a single particular element also encompass a plurality of such particular elements. Many other changes and modifications may be made to the present invention without departing from the spirit thereof. The scope of these and other changes will become apparent from the appended claims. The steps of the methods described herein may be varied, and carried out in different sequences.

What is claimed is:

1. A vehicle HVAC system comprising:
   a housing for the system, wherein the housing includes a wall;
   an evaporator;
   a heater core;
   an air mixing door between the evaporator and the heater core, the air mixing door being configured to selectively direct a portion of an airflow to the either bypass or pass over the heater core; and
   a baffle formed as a cutout of the wall of the housing forming a vertical indentation projecting into an area available to the bypass airflow;
   wherein the baffle is configured to gradually change the area available to the bypass airflow as the air mixing door is moved such that a change in a pressure upstream of the air mixing door and a restriction in the airflow path result wherein the baffle further includes a spoiler and a projection;

wherein the baffle is separate from the air mixing door such that, when the air mixing door moves, the baffle does not move relative to the wall of the housing;

wherein the spoiler is connected to the vertical indentation downstream of the vertical indentation, wherein the spoiler has a curved surface having a concave side facing an interior of the housing and a convex side facing an exterior of the housing; and wherein the projection is connected to the spoiler downstream of the spoiler, the projection having a convex side facing the interior of the housing and a convex side facing the exterior of the housing.

2. The HVAC system of claim 1, wherein the baffle is positioned downstream of the evaporator and upstream of the air mixing door.

3. The HVAC system of claim 1, wherein the air mixing door cooperates with the curved surface of the spoiler to restrict the area available to the bypass airflow.

4. The HVAC system of claim 1, wherein a ratio of a length of the spoiler to a height of the spoiler is from about 5:1 to 1:5.

5. The HVAC system of claim 4, wherein the ratio of the length of the spoiler to the height of the spoiler is from about 4:1 to 1:1.

6. The HVAC system of claim 4, wherein the ratio of the length of the spoiler to the height of the spoiler is from about 3:1 to 2:1.

7. A method of regulating airflow through a vehicle HVAC system that includes a housing which includes a wall, an air mixing door, and a baffle structure within an air flow region of the vehicle HVAC system, the method comprising:

passing air through the system and adjusting a position of the air mixing door relative to the baffle structure to determine a bypass air flow area, wherein the baffle structure is formed as a cut out of the wall of the housing forming a vertical indentation projecting into the bypass flow area, and the baffle includes a spoiler and a projection, wherein the baffle structure is configured to gradually change the bypass flow area as the air mixing door is moved such that a change in a pressure upstream of the air mixing door and a restriction in the airflow path result, wherein the baffle structure is separate from the air mixing door such that, when the air mixing door moves, the baffle structure does not move relative to the wall of the housing, wherein the spoiler is connected to the vertical indentation downstream of the vertical indentation, wherein the spoiler has a curved surface having a concave side facing an interior of the housing and a convex side facing an exterior of the housing, and wherein the projection is connected to the spoiler downstream of the spoiler, the projection having a convex side facing the interior of the housing and a convex side facing the exterior of the housing.

8. The method of claim 7, wherein a relationship between a controller position and a normalized temperature of the HVAC system is generally linear.

9. A vehicle HVAC system comprising:

a housing, wherein the housing includes a wall;

an evaporator;

a heater core;

an air mixing door configured to selectively direct a portion of an airflow to either bypass or pass over the heater core; and a structure positioned downstream of the evaporator and upstream of the air mixing door, the structure formed as a cut out of the wall of the housing forming a vertical indentation projecting into an area available for bypass airflow;

wherein the structure includes a spoiler and a projection, wherein the spoiler is connected to the vertical indentation downstream of the vertical indentation, wherein the spoiler has a curved surface having a concave side facing an interior of the housing and a convex side facing an exterior of the housing, wherein the projection is connected to the spoiler downstream of the spoiler, the projection having a convex side facing the interior of the housing and a convex side facing the exterior of the housing, wherein the structure is configured to gradually change the area available for bypass airflow as the air mixing door is moved such that a change in a pressure upstream of the air mixing door and a restriction in the airflow path result, wherein a relationship between a controller position and an output temperature of the HVAC system is generally linear, and wherein the structure is separate from the air mixing door such that, when the air mixing door moves, the structure does not move relative to the wall of the housing.

10. The HVAC system of claim 1, wherein the air mixing door is located inside the housing.

11. The HVAC system of claim 10, wherein the evaporator is located inside the housing.

12. The method of claim 7, wherein the air mixing door is located inside the housing.

13. The HVAC system of claim 9, wherein the air mixing door is located inside the housing.

* * * * *